(12) United States Patent
Licher et al.

(10) Patent No.: US 7,413,236 B2
(45) Date of Patent: Aug. 19, 2008

(54) CONVERTIBLE VEHICLE

(75) Inventors: Klaus Licher, Georgsmarienhütte (DE); Heiko Schonhorst, Westerkappeln (DE)

(73) Assignee: Wilhelm Karmann GmbH, Osnabrück (DE)

( * ) Notice: Subject to any disclaimer, the term of this patent is extended or adjusted under 35 U.S.C. 154(b) by 0 days.

(21) Appl. No.: 10/577,080

(22) PCT Filed: Oct. 8, 2004

(86) PCT No.: PCT/DE2004/002239

§ 371 (c)(1),
(2), (4) Date: Feb. 12, 2007

(87) PCT Pub. No.: WO2005/039909

PCT Pub. Date: May 6, 2005

(65) Prior Publication Data

US 2007/0187982 A1    Aug. 16, 2007

(30) Foreign Application Priority Data

Oct. 24, 2003   (DE) ............................... 103 49 821

(51) Int. Cl.
*B00J 10/10* (2006.01)
(52) U.S. Cl. ............................................. 296/107.11 B
(58) Field of Classification Search ............ 296/107.11, 296/165, 107.09, 107.15, 107.01, 107.12
See application file for complete search history.

(56) References Cited

U.S. PATENT DOCUMENTS

| | | | | |
|---|---|---|---|---|
| 2,172,303 A | * | 9/1939 | Uebergang | ................. 296/118 |
| 4,573,732 A | * | 3/1986 | Muscat | ...................... 296/108 |
| 5,004,291 A | * | 4/1991 | Bauer et al. | ................. 296/116 |
| 5,667,269 A | * | 9/1997 | Prenger et al. | ......... 296/107.09 |
| 5,738,402 A | | 4/1998 | Aydt et al. | |
| 6,139,087 A | * | 10/2000 | Wolfmaier et al. | ..... 296/107.16 |
| 6,237,986 B1 | * | 5/2001 | Neubrand et al. | ...... 296/107.01 |
| 6,464,284 B2 | * | 10/2002 | Neubrand | ............. 296/107.01 |
| 6,601,906 B2 | * | 8/2003 | Deadrick et al. | ............ 296/121 |
| 7,104,587 B2 | * | 9/2006 | MacNee et al. | ........ 296/107.11 |
| 2004/0232721 A1 | * | 11/2004 | Rawlings et al. | ....... 296/107.09 |
| 2006/0232098 A1 | * | 10/2006 | Theuerkauf | ................. 296/108 |
| 2007/0187982 A1 | * | 8/2007 | Licher et al. | ........... 296/107.11 |
| 2007/0194595 A1 | * | 8/2007 | Papendorf | .............. 296/107.01 |

FOREIGN PATENT DOCUMENTS

| | | |
|---|---|---|
| DE | 44 05 356 | 8/1995 |
| DE | 196 47 680 | 5/1998 |
| EP | 0 628 438 | 12/1994 |
| EP | 1 393 948 | 3/2004 |

\* cited by examiner

*Primary Examiner*—Kiran B. Patel
(74) *Attorney, Agent, or Firm*—Friedrich Kueffner

(57) ABSTRACT

The invention relates to a convertible vehicle (1) provided with a moveable roof (2) which comprises a flexible roof covering in at least certain areas (4), said flexible roof covering being retained by a partial section of the outer edge thereof (6) via at least one retaining strip (11) on at least one frame part (7;8) of a roof stand (3). The retaining strip (11) extends in an essentially parallel manner in relation to the frame part (7;8) of the roof stand (3) when in a connecting position and is retained thereon. The invention is characterised in that that the retaining strip (11) can be connected to the frame part (7;8) due to displacement thereof using a displacement component (15) extending parallel to the extension thereof.

13 Claims, 7 Drawing Sheets

CONVERTIBLE VEHICLE

BACKGROUND OF THE INVENTION

1. Field of the Invention

The invention concerns a convertible vehicle with a movable roof, which is furnished partially or completely with a flexible roof covering.

2. Description of the Related Art

A convertible vehicle of this type often has—beyond a rear window—a flexible roof covering over its entire roof or may have, for example, a rigid roof section in the front area of the roof and a flexible covering that extends over the width of the vehicle only in the rear area of the roof. In any case, the roof covering can be connected both to lateral frame parts of a roof frame that supports the movable roof and in its rear area to a frame part that is designed as a tension bow and runs essentially transversely to the vehicle, and, with the roof closed, the roof covering can be stretched over the roof frame, resting on a section of the automobile body.

To ensure sufficient tightness at the edges of the roof covering and to prevent bulging of the roof at high speeds, a stable connection of the edge regions with the respective frame parts along a line is necessary.

To this end, it is known that edges of the roof covering can be connected with cleats, for example, by stitching along a line. The cleats are then connected with the respective frame part by several rivets following in succession in the course of the respective frame parts and set transversely to these frame parts. Replacement of the roof covering that may be desired after damage or wear has occurred then requires that all of the rivets be drilled out, which makes the replacement process more difficult.

SUMMARY OF THE INVENTION

The objective of the invention is to improve a convertible vehicle of the specified type with respect to the fastening of the roof covering to a roof frame that supports the movable roof.

The invention achieves this objective with a. convertible vehicle in which the cleat can be connected with the frame part by a motion with a motion component that runs parallel to its extent and with a vehicle roof including the cleat.

The invention creates a reliable and, compared to the prior art, more easily detachable connection of the roof covering to frame parts of the roof frame.

If, for example, on a frame part, besides several longitudinally extending hooks or similar positive-locking engaging devices, only one transverse securing device, e.g., a screw or rivet, is provided as a means of preventing the roof covering from being pulled out of the roof frame, the opening of this connection then requires only that this one transverse securing device be pulled out. The hooks can then be easily pulled out.

As a result of the connection of a cleat with the respective frame part that is to be entered in parallel to the respective frame part, a force acting in this direction can be counteracted especially well. Therefore, a connection of this type is especially advantageous for lateral upwardly projecting main posts of the roof frame, i.e., the frame parts that extend laterally from the belt line to an essentially horizontal region of the roof. A considerable force component acts at the main post with the roof closed on the connection to the roof covering parallel to the course of the connection.

Insertion of the hook parts with a component in the direction of vehicle travel counteracts this force very reliably.

It is especially advantageous from the standpoint of production engineering if the cleats are formed as single parts with the hooks.

The connection of the cleats with the roof covering with the invention also remains possible in exactly the same way as before.

Further advantages and features of the invention are explained below with reference to the specific embodiment illustrated in the drawings.

DETAILED DESCRIPTION OF THE PREFERRED EMBODIMENTS

Figure 1:
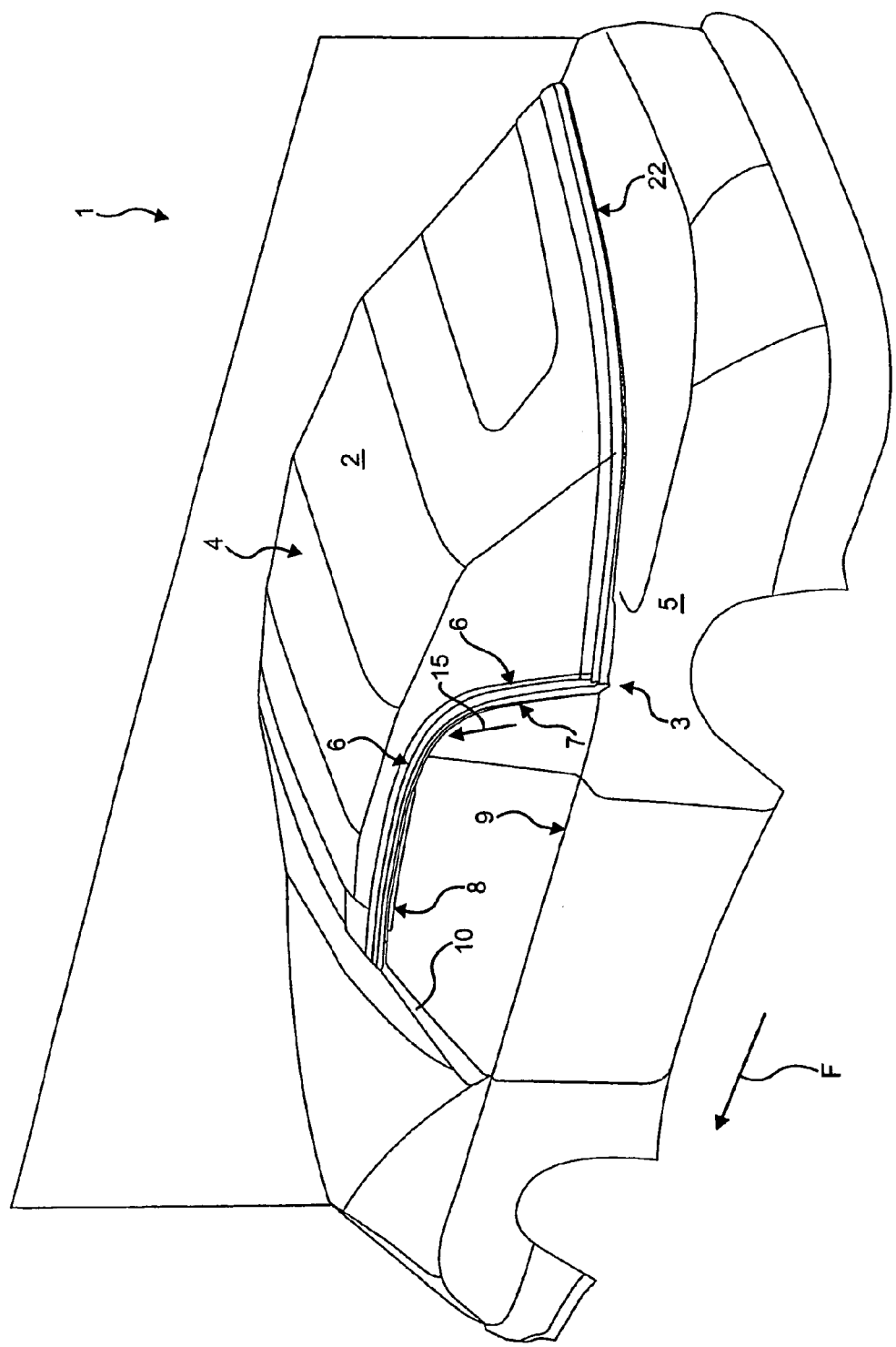
FIG. 1 shows a schematic oblique rear perspective view of an upper area of a convertible motor vehicle of the invention with the roof closed, for the sake of clarity, drawn to show only the left side of a vertical longitudinal plane.
Figure 2:
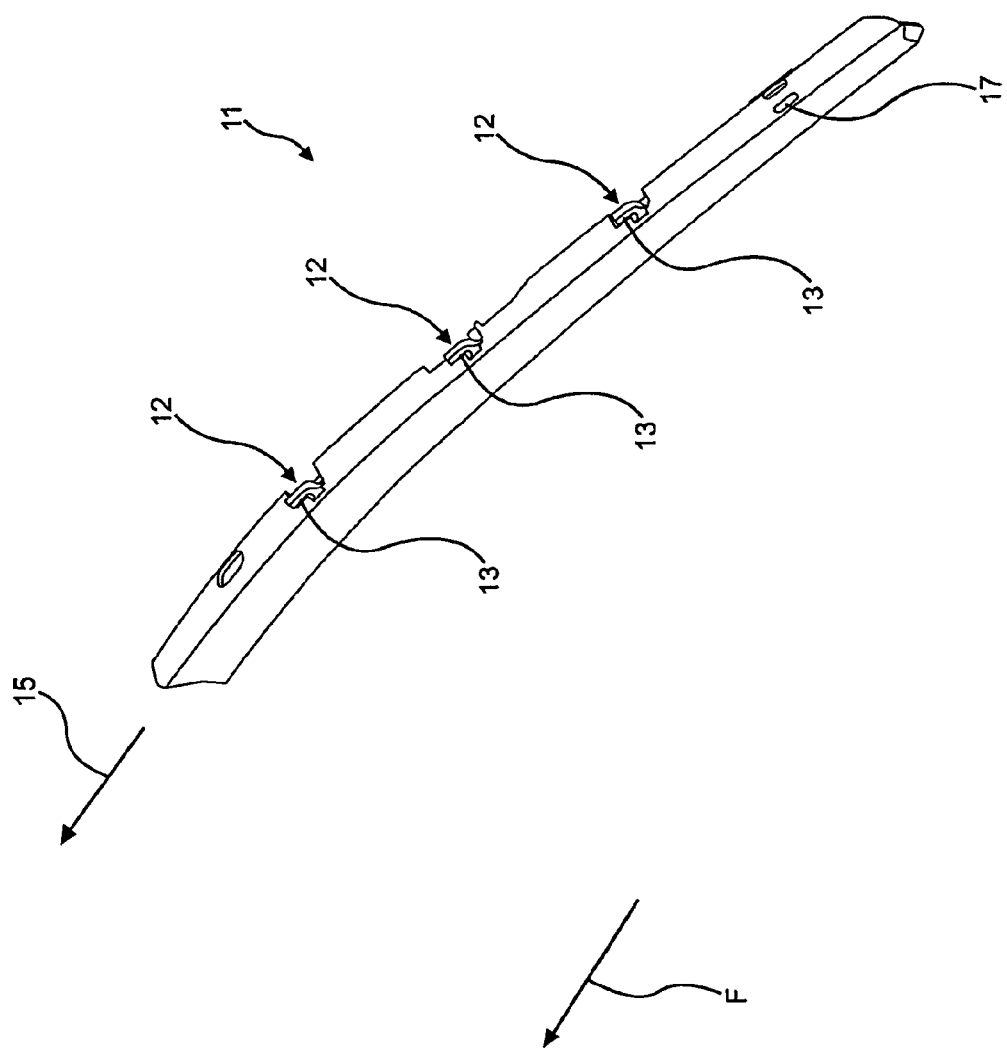
FIG. 2 shows a perspective component drawing, which is oriented approximately according to the installed position in FIG. 1, of a cleat assigned to the main post with in this case three hooks and a through-hole for a device to prevent pulling-away.

The convertible vehicle 1 in FIG. 1, which is shown only cutaway and schematically in its upper region, is designed as a two-seat sports car and has a movable roof 2, which includes a movable frame that is labeled here as a whole by reference number 3 and is completely covered by a roof covering 4. Alternatively, it is also possible to provide a flexible covering only over a portion of the roof 2, which has one or more rigid skin sections beyond the flexible area of the roof. The roof 2 as a whole can be opened by lowering it onto or into the automobile body 5.

In the convertible vehicle 1 illustrated here, the roof covering 4 is secured by its transversely outer edges 6 to lateral frame parts 7, 8 of the roof frame 3. In the illustrated example, two frame parts 7, 8 are provided on each side of the vehicle, but this is not a requirement. In particular, in a larger convertible vehicle that has a back seat, it is possible for there to be more lateral frame parts.

The frame part 7 is designed here as a so-called main post, which extends upward from a belt line 9 and is sloped forward in the direction of vehicle travel F as far as a transition to the front, more horizontally oriented frame part 8. This transition region is located approximately in the upper head region of the occupants of the vehicle. Due to the fact that the roof 2 in its closed state is clamped at the front to a windshield frame 10 and at the rear by a tension bow 22 that extends transversely to the motor vehicle, high tensile forces thus act on the roof covering 4 precisely at the main post 7, and these tensile forces try to release the roof covering 4 from its connection with the main post 7.

The roof covering 4, which can consist, e.g., of a textile material or even of a plastic material, is therefore connected along a line with the frame parts 7, 8 and to this end is stitched, welded, adhesively bonded, or similarly connected in a permanent way at its edges 6 with a cleat or in the illustrated case several cleats 11 at least over almost the entire length of each cleat 11. Weldbonding is also a possibility.

The cleat 11 can be made from a light plastic, for example, polyamide, and here is provided with several hooks 12 aligned one after the other. As illustrated here, these hooks 12 can be formed as a single piece with the cleat to simplify production engineering. The heads 13 of the hooks are oriented parallel to one another and in the direction of extension of the cleat 11. The frame parts 7, 8 (or more) are furnished with complementary elongated recesses 14 that follow the course of the heads 13 of the hooks 12. These recesses 14 are sufficiently long for the head 13 of a hook 12 to pass through them.

To install the roof 2, the roof covering 4 is first permanently connected with the cleat(s) 11 in the manner described above. The cleats 11 are then connected with the frame 3 in such a way that the hooks 12 are inserted in the recesses 14 of the frame parts 7, 8, and the cleats 11 are moved with a motion component in the direction of vehicle travel F parallel to the respective frame part 7, 8 in the direction of arrow 15 until the heads 13 of the hooks 12 are secured with positive locking behind the lateral edges of the recesses 14. To prevent backward movement of the cleat 11 against the direction of insertion 15, a blocking device 16 that prevents pulling-out can be installed, e.g., in the form of an individual rivet, screw, or the like, which passes through a hole 17 in the cleat 11 and the respective frame part 7, 8. Since the tensile force of the stretching of the roof covering acts in the direction of insertion 15, the device 16 that prevents pulling-out must absorb only small forces and can have small dimensions. Depending on the action of the forces, it can also be possible for the direction of insertion to have a component opposite the direction of vehicle travel F.

A similar connection between the roof covering 4 and the roof frame 3 can be additionally or alternatively realized at a rear tension bow 22, and due to the symmetry with respect to a vertical longitudinal center plane of the vehicle, the hooks could be oriented in any desired way. The connection of the front frame part 8 with the edge 6 of the roof covering 4 can also be made in accordance with the invention.

Figure 3:
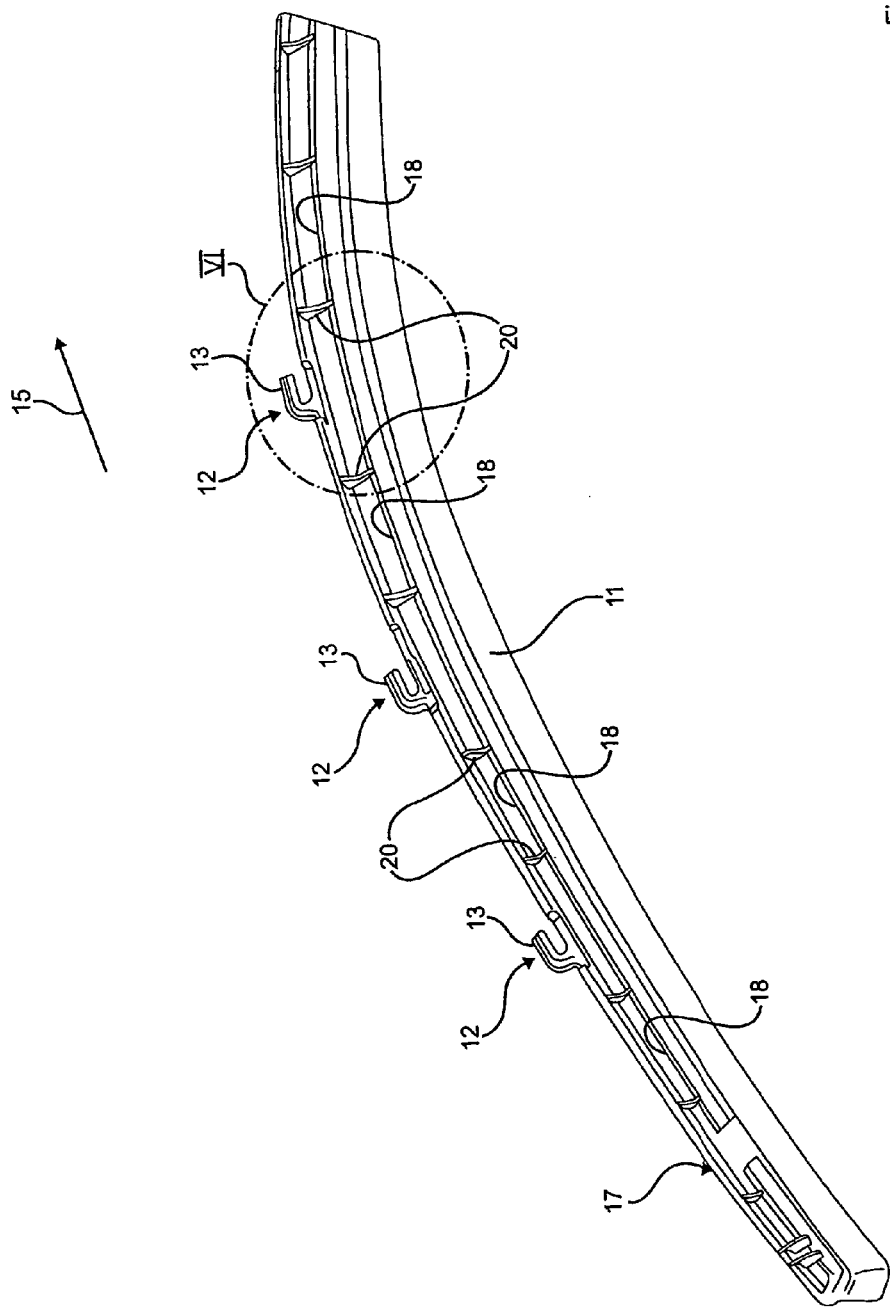
FIG. 3 shows the cleat according to FIG. 1 in a side view from the interior of the vehicle.
Figure 4:
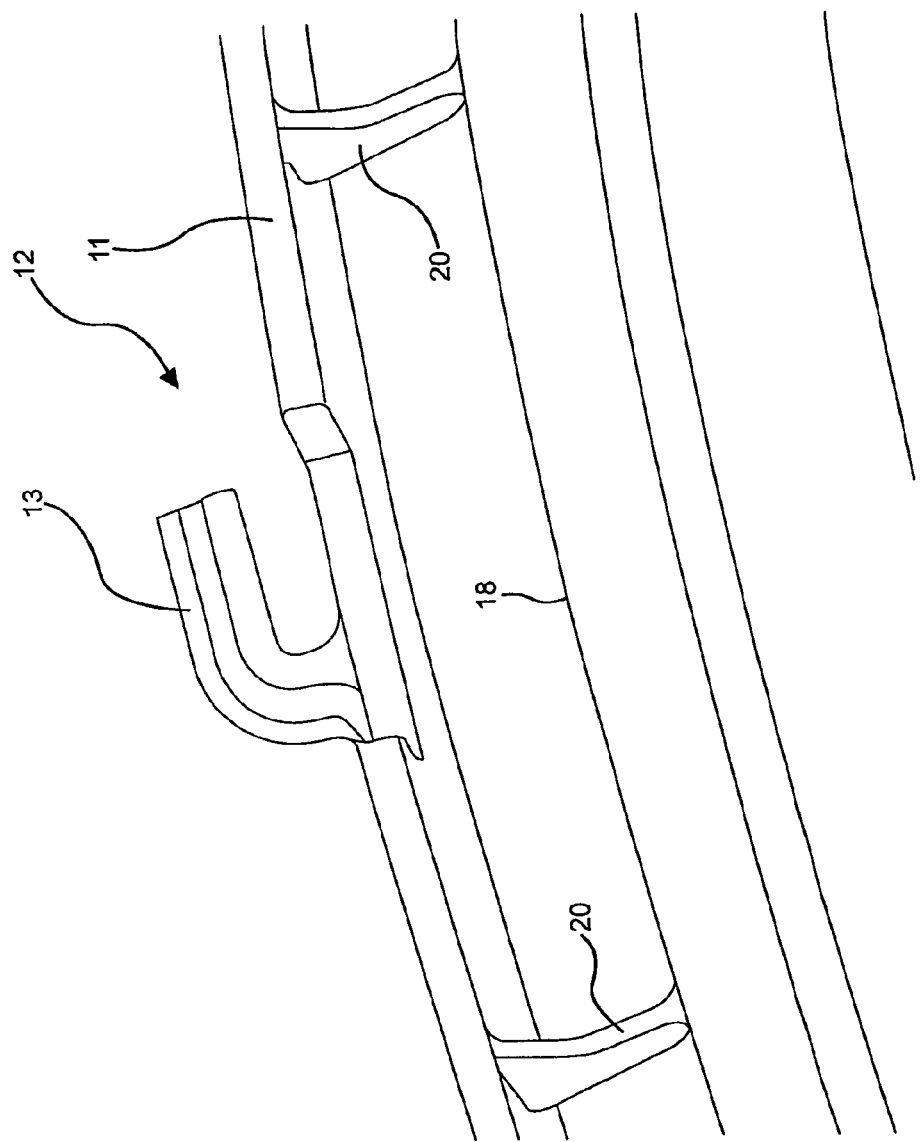
FIG. 4 shows the detail IV in FIG. 3.
Figure 5:
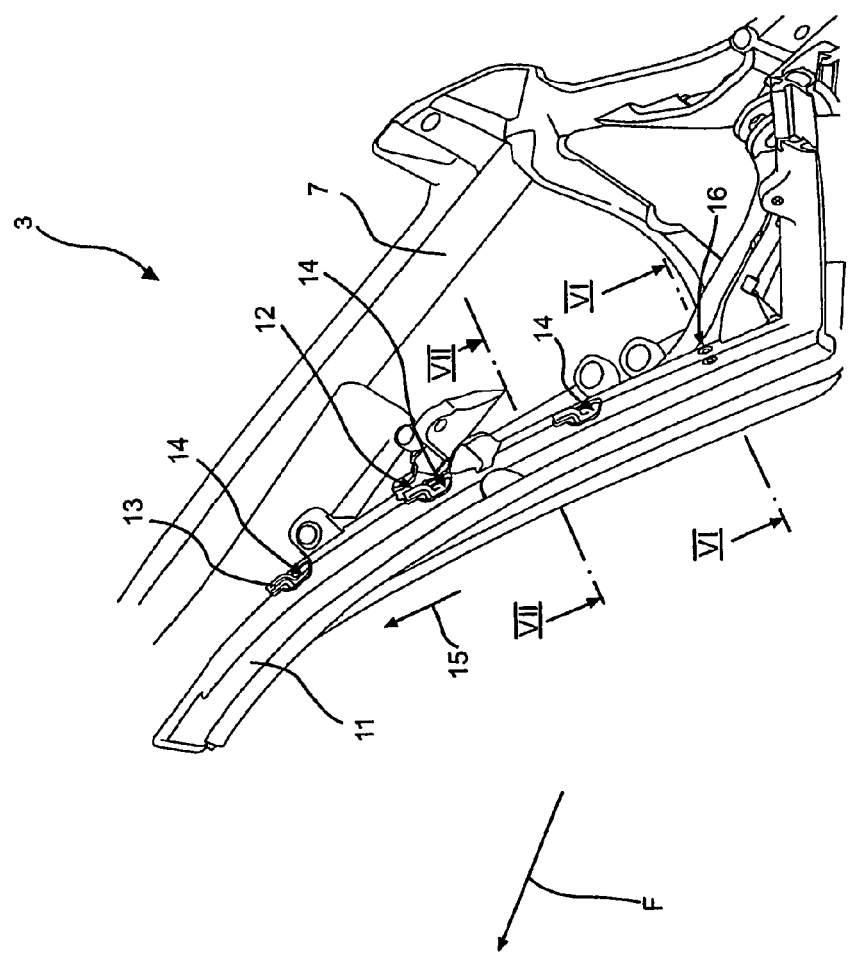
FIG. 5 shows a detail view of a main post, which is oriented approximately according to the installed position in FIG. 1, with the cleat mounted on it.
Figure 6:
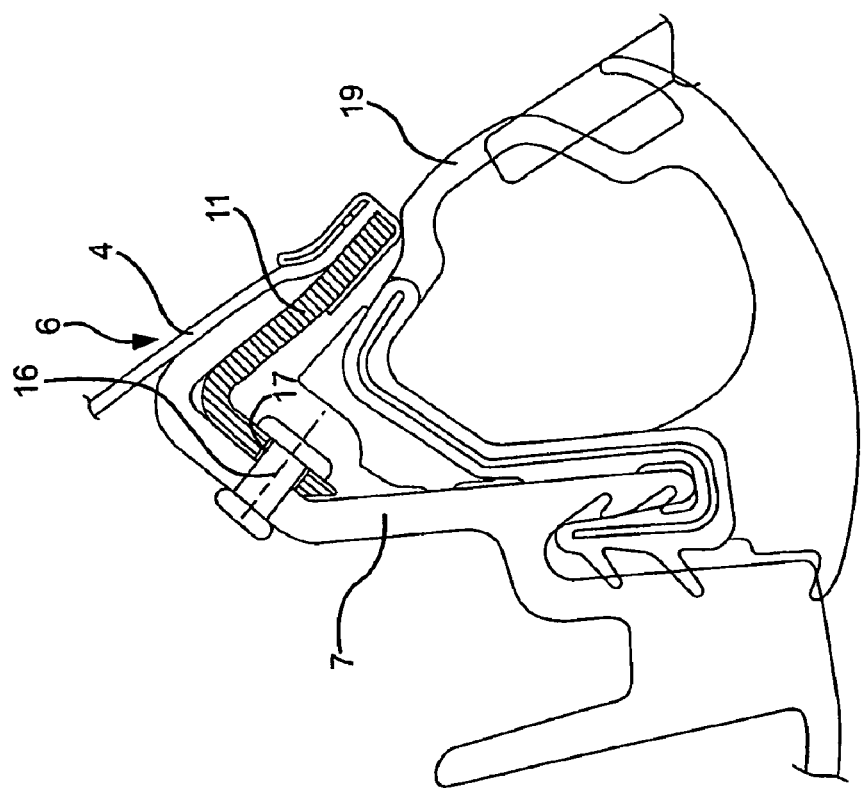
FIG. 6 shows a section corresponding approximately to line VI-VI in FIG. 5.
Figure 7:
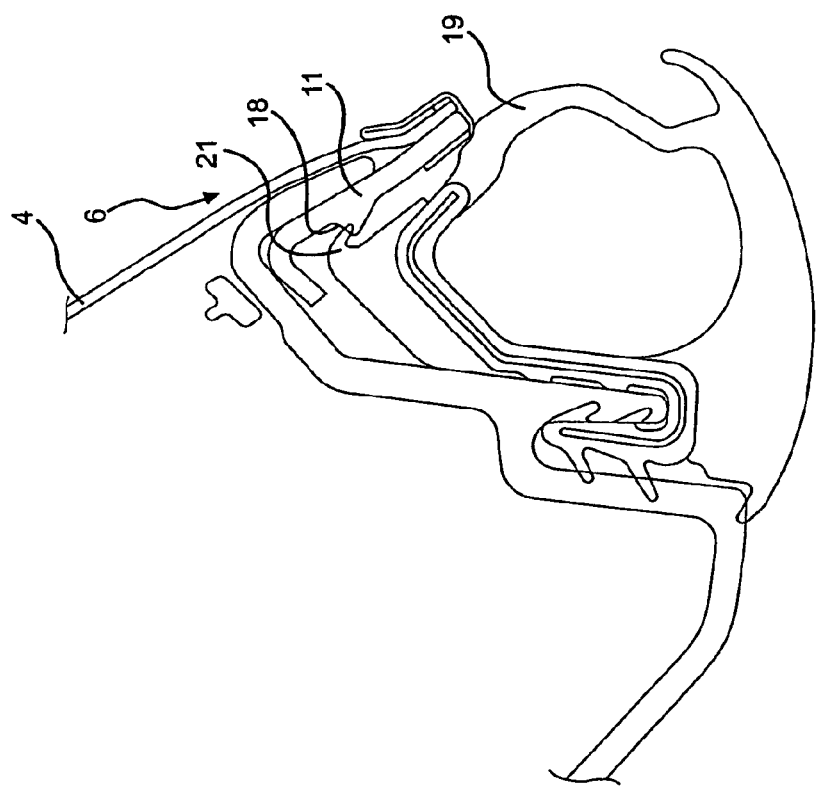
FIG. 7 shows a section corresponding approximately to line VII-VII in FIG. 5.

As FIG. 6 shows, over at least a portion of its course, the cleat 11 is provided with a step 18, on which a seal 19, which seals the edge 6 of the roof 2 against side windows or the automobile body, is supported. In this connection, the step 18 can form a groove, which is interrupted by individual transverse webs 20 (see FIG. 3). The groove 18 is provided for the engagement of a complementary interrupted extension 21 of the seal 19. This ensures not only good support of the seal 19 but also its precise longitudinal alignment with respect to the cleat 11.

The invention claimed is:

1. Convertible vehicle (1) with a movable roof (2), at least a portion of which has a flexible roof covering (4), which is held with a section of its outer edge (6) by at least one cleat (11) on at least one frame part (7; 8) of a roof frame (3), wherein the cleat (11), in its connected position, runs essentially parallel to and is held on a frame part (7; 8) of the roof frame (3), wherein the cleat (11) can be connected with the frame part (7; 8) by a motion with a motion component (15) that runs parallel to its extent.

2. Convertible vehicle in accordance with claim 1, wherein the cleat (11) can be connected with the frame part (7; 8) by a positive-locking connection.

3. Convertible vehicle in accordance with claim 1, wherein the cleat (11) is furnished with several projecting hooks (12) along its length.

4. Convertible vehicle in accordance with claim 3, wherein the hooks (12) are formed as a single piece with the cleat (11).

5. Convertible vehicle in accordance with claim 3, wherein each frame part (7; 8) is provided with elongated recesses (14) that are adapted to the direction of extension (15) of the hooks (12) and receive the heads (13) of the hooks (12).

6. Convertible vehicle in accordance with claim 1, wherein at least one cleat (11) is assigned at least to each side of the vehicle.

7. Convertible vehicle in accordance with claim 1, wherein at least one extraction blocking device (16), which prevents parallel displacement between the cleat (11) and the frame part (7; 8), is assigned to each cleat (11) in its connected position with a frame part (7; 8).

8. Convertible vehicle in accordance with claim 3, wherein each head (13) of a hook (12) has a component that points in the direction of vehicle travel (F) and can be inserted into a corresponding recess (14) in each frame part (7; 8) with a motion component relative to the frame part (7; 8) in the direction of vehicle travel (F) to allow connection with the frame part (7; 8).

9. Convertible vehicle in accordance with claim 1, wherein at least one cleat (11) is assigned to a rear tension bow (22) that runs essentially transversely to the motor vehicle (1).

10. Convertible vehicle in accordance with claim 1, wherein the cleat(s) (11) consist of plastic, especially polyamide, and are connected with the roof covering (4) by adhesive bonding, stitching, weldbonding, and/or welding.

11. Convertible vehicle in accordance with claim 1, wherein the cleat (11) has a step (18) for supporting an overlapping section of a seal (19) that runs parallel to the frame part (7; 8).

12. Roof (2) for a convertible vehicle (1) in accordance with claim 1.

13. Cleat (11) for a roof (2) in accordance with claim 12.

* * * * *